(12) United States Patent
Zabinski et al.

(10) Patent No.: US 6,704,882 B2
(45) Date of Patent: Mar. 9, 2004

(54) DATA BIT-TO-CLOCK ALIGNMENT CIRCUIT WITH FIRST BIT CAPTURE CAPABILITY

(75) Inventors: Patrick Joseph Zabinski, Stewartville, MN (US); Michael John Degerstrom, Rochester, MN (US); Barry K. Gilbert, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 553 days.

(21) Appl. No.: 09/766,941

(22) Filed: Jan. 22, 2001

(65) Prior Publication Data

US 2002/0133730 A1 Sep. 19, 2002

(51) Int. Cl.⁷ .................................. G06F 1/04
(52) U.S. Cl. ...................................... 713/401
(58) Field of Search ................ 713/400, 401, 713/503

(56) References Cited

U.S. PATENT DOCUMENTS

| | | | |
|---|---|---|---|
| 3,588,707 A | 6/1971 | Manship | 328/55 |
| 4,359,770 A | 11/1982 | Suzuka | 370/108 |
| 4,700,347 A | 10/1987 | Rettberg et al. | 371/1 |
| 4,713,621 A | 12/1987 | Nakamura et al. | 328/55 |
| 4,756,011 A | 7/1988 | Cordell | 375/118 |
| 4,821,296 A | 4/1989 | Cordell | 375/119 |
| 5,081,655 A | 1/1992 | Long | 375/119 |
| 5,245,637 A | 9/1993 | Gersbach et al. | 375/119 |
| 5,349,612 A | 9/1994 | Guo et al. | 375/118 |
| 5,367,542 A | 11/1994 | Guo | 375/110 |
| 5,400,370 A | 3/1995 | Guo | 375/118 |
| 5,467,464 A | 11/1995 | Oprescu et al. | 395/550 |
| 5,537,069 A | 7/1996 | Volk | 327/149 |
| 5,708,382 A | 1/1998 | Park | 327/277 |
| 5,761,254 A | 6/1998 | Behrin | 375/355 |
| 5,778,214 A | 7/1998 | Taya et al. | 395/551 |
| 5,818,890 A | 10/1998 | Ford et al. | 375/371 |
| 5,822,386 A | 10/1998 | Pawelski | 375/373 |
| 5,872,959 A | 2/1999 | Nguyen et al. | 395/552 |
| 5,909,133 A | 6/1999 | Park | 327/277 |
| 5,945,861 A | 8/1999 | Lee et al. | 327/277 |
| 6,041,419 A | 3/2000 | Huang et al. | 713/401 |
| 6,108,794 A | 8/2000 | Erickson | 713/401 |

*Primary Examiner*—Thomas M. Heckler
(74) *Attorney, Agent, or Firm*—Faegre & Benson LLP

(57) ABSTRACT

A circuit for aligning the phase of a parallel data signal to a clock signal. The circuit includes a parallel data terminal for receiving a parallel data signal formed by multiple word bits, a clock terminal for receiving a clock signal, and a data ready terminal for receiving a data ready signal which has a logic state transition aligned with a first information bit of the parallel data signal. A plurality of data signal delay and sampling circuits connected to the clock terminal and the parallel data terminal provide time-slice bit samples of each information bit of the parallel data signal. A comparator and decision circuit coupled to the clock terminal and at least one of the data signal delay and sampling circuits compares and selects one of the plurality of time-slice bit samples which is phase aligned with the clock signal. A multiplexer circuit coupled to each data signal delay and sampling circuit and to the comparator and decision circuit outputs the selected time-slice bit sample of each word bit of the parallel data signal as the phase-aligned parallel data signal. A first-bit intialization circuit connected to the clock terminal and the data ready terminal and coupled to the multiplexer causes the time-slice bit samples corresponding in time to the logic state transition of the data ready signal to be outputted as a first one or more information bits of the phase-aligned data signal before the comparator and decision circuit operates to compare and select one of the plurality of time-slice bit samples.

17 Claims, 7 Drawing Sheets

DATA BIT-TO-CLOCK ALIGNMENT
CIRCUIT WITH FIRST BIT CAPTURE
CAPABILITY

FIELD OF THE INVENTION

The present invention is a digital circuit for aligning or synchronizing the phase of the bits of a digital Data signal to a Clock signal.

BACKGROUND OF THE INVENTION

Computers and other digital data processing systems are typically formed from a number of components or subsystems. The operation of these systems requires the transmission of Data signals and Clock signals between the subsystems. In order for the subsystems to accurately process the Data signals, the phase of the Data signals must be accurately aligned or synchronized in time with the phase of the Clock signals. As these data processing systems become more complex and data and clock rates are pushed to ever higher levels, even relatively short differences in the length of the wires or other transmission paths between the Data and Clock signals can produce an unacceptable phase skew or misalignment between these signals.

Phase misalignments of the type described above between Data and Clock signals can be described with reference to FIG. 1. In the example shown, the Data signal 10 is a time-varying waveform in which logic "1" bits are represented by a steady, relatively high voltage level and logic "0" bits are represented by a steady, relatively low voltage level. Sections of the signal 10 are overlaid on one another, with each bit beginning at the same relative location, to create the eye diagram 12. Eye diagrams such as 12 are commonly used to illustrate the characteristics of signals such as 10. As is evident from eye diagram 12, finite periods of time are required for the signal 10 to switch between its two logic states. During these transition periods of time the logic states are not clearly defined (i.e., the voltage level is at neither the relatively high nor the relatively low level, but is instead somewhere in between).

Three different Clock signals 14A, 14B and 14C are shown in relation to the eye diagram 12 in FIG. 1. All the Clock signals 14A, 14B and 14C have the same period and frequency, but are shown at different phase relationships to the eye diagram 12. The phase alignment between the eye diagram 12 and Clock signals 14A and 14B has the Clock signals occurring during the period of time that the Data signals are changing states (i.e., during the transition region of the eye diagram). Under these circumstances a subsystem using one of Clock signals 14A or 14B to sample the Data signal 10 would be unable to accurately identify the correct logic state. To provide accurate sampling, the relative phase between the Clock signals and the Data signals should place the Clock signal near the center of the "eye" (i.e., during the stable region of the eye diagram). Clock signal 14C, for example, is relatively well aligned with the Data signal 10.

Circuits for aligning or synchronizing the bits of digital Data signals to Clock signals are generally known and disclosed, for example, in the following U.S. patents.

| U.S. Pat. No. | Inventor |
|---|---|
| 4,700,347 | Rettberg et al. |
| 4,756,011 | Cordell |
| 4,821,296 | Cordell |
| 5,081,655 | Long |
| 5,349,612 | Guo et al. |
| 5,400,370 | Guo |
| 5,778,214 | Taya et al. |
| 5,818,890 | Ford et al. |
| 5,822,386 | Pawelski |

Still other digital data processing systems extract the clock from the raw data stream. In systems of this type the clock recovery circuit outputs a clock signal which is not necessarily phase aligned with the data signal. Error rates in systems of this type can be relatively high.

Digital data systems generally rely on the phase synchronization between the digital Data signals and a common Clock signal distributed to all the major subsystems. As the clock frequency increases, the accuracy of the time alignment between the subsystems and their components becomes more stringent. Furthermore, as the number of subsystems and associated components increases in more complex systems, the ability to distribute an accurate Clock signal becomes more difficult For these reasons there remains a continuing need for improved data bit alignment circuits. A data bit alignment circuit capable of being implemented entirely with digital logic would be particularly advantageous. A circuit of this type which is capable of effectively aligning the first bit of a Data signal to the Clock signal would be particularly useful. The circuit should, of course, also be accurate and capable of compensating for periodic drift between the relative phases of the Clock and Data signals.

SUMMARY OF THE INVENTION

The present invention is an efficient-to-implement data signal-to-clock signal phase alignment circuit which provides first bit capture capability. The circuit includes a data signal delay and sampling circuit, a comparator and decision circuit, and a multiplexer. The data signal delay and sampling circuit is connected to receive the data signal and the clock signal, and provides a plurality of time-slice bit samples of the data signal. The comparator and decision circuit is coupled to the data signal delay and sampling circuit, and compares and selects one of the plurality of time-slice bit samples which is phase aligned with the clock signal. The multiplexer is coupled to the data signal delay and sampling circuit and to the comparator and decision circuit, and outputs the selected time-slice bit sample as the phase-aligned data signal. Also included is an initial-bit intialization circuit connected to receive the clock signal and a data ready signal and coupled to the multiplexer. The initial-bit initialization circuit causes the time-slice bit sample corresponding in time to the data ready signal to be outputted as an initial one or more bits of the phase-aligned data signal before the comparator and decision circuit operates to compare and select one of the plurality of time-slice bit samples.

DETAILED DESCRIPTION OF THE PREFERRED EMBODIMENTS

Figure 2:
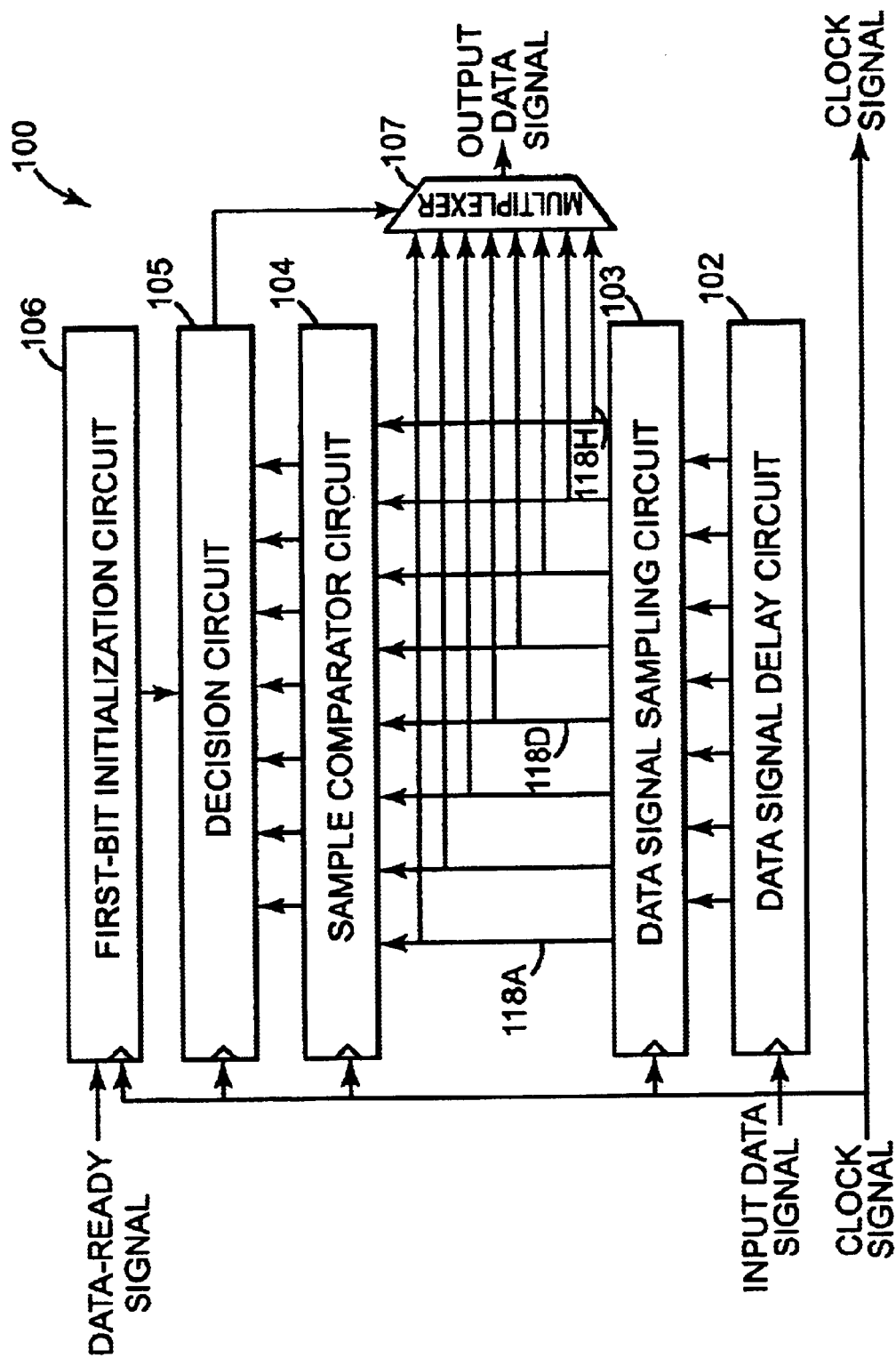
FIG. 2 is a block diagram of a data bit alignment circuit in accordance with the present invention.

A data bit alignment circuit 100 in accordance with the present invention is illustrated generally in FIG. 2. The circuit 100 is used to align or synchronize the relative phase of two signals such as a Clock signal and a digital Data signal. As shown, the data bit alignment circuit 100 includes a data signal delay circuit 102, data signal sampling circuit 103, sample comparator circuit 104, decision circuit 105, first-bit intialization circuit 106 and multiplexer 107. The Clock signal is applied to the data signal sampling circuit 103, sample comparator circuit 104, decision circuit 105 and first-bit intialization circuit 106. The digital Data signal (i.e., a stream of bits) to be phase-aligned to the Clock signal is applied to the data signal delay circuit 102. Alignment circuit 100 also makes use of a Data Ready signal which enables the circuit to align the first bit of the Data signal to the Clock signal. As is described in greater detail below, the alignment circuit 100 can quickly (even on the first bit) and accurately synchronize a digital Data signal to a Clock signal. The circuit can maintain this accurate synchronization in the presence of phase drift between the Clock and Data signals.

Briefly, the incoming Data signal is effectively delayed by the delay circuit 102, enabling each bit of the Data signal to be sampled at several (N) locations by the sampling circuit 103. Each of the bit samples is applied to both the comparator circuit 104 and the multiplexer 107. The comparator circuit 104 compares the adjacent bit samples and provides "sameness" or comparison data signals to the decision circuit 105 which are representative of whether the adjacent bit samples have the same or different logic states. In effect, the comparison data is characteristic of whether the Data signal bit switched logic states at the point in time corresponding to the sample (i.e., whether the bit sample was taken at a point in time corresponding to the transition region or stable region in the eye diagram 12 (FIG. 1)). The decision circuit 105 processes the comparison data signals on the basis of a decision algorithm to determine which of the Data signal bit samples was taken at a point in time corresponding to the stable region of the eye diagram 12 (e.g., was the most "same"). The output of the decision circuit 105 is a sample select signal which causes the multiplexer 107 to output the selected Data signal bit sample as the sample which is aligned with the Clock signal (i.e., the phase-aligned Data signal). The Data Ready signal, which provides an initial-bit control function, is a signal which switches logic states at a time corresponding to the beginning of the first bit of a "new" Data signal. In response to the receipt of a Data Ready signal, the first-bit initialization circuit 106 causes the decision circuit 105 and multiplexer 107 to select the Data signal bit sample which corresponds in time to the logic level transition of the Data Ready signal as the first Data signal bit sample of the phase-aligned Data signal outputted by the multiplexer 107.

The operation of data signal delay circuit 102 and data signal sampling circuit 103 can be described in greater detail with reference to FIG. 3. In the embodiment shown, the delay circuit 102 is formed by a plurality of series-interconnected delay elements 110A–110G which effectively divide the incoming Data signal into N sections, where N is an integer greater than 1. The original (not delayed) Data signal (at node 111A) and the delayed Data signals present at the output of each of the elements 110A–110G (nodes 111B–111H, respectively) are simultaneously applied to the sampling circuit 103. Although the illustrated embodiment of the delay circuit 102 includes seven delay elements 110A–110G configured for N=8, any desired number of delay elements can be used. In general, the delay elements 110A–110G will be configured to delay the Data signal by time periods which are considerably less than the period of the bits of the Data signal to provide several samples from each bit. The desired number of delay elements will typically be selected on the basis of a variety of factors including the desired degree of accuracy or resolution to be achieved by the alignment circuit 100 and the period or length of the bits of the Data signal. The amount of delay imparted to the Data signal by each element 110A–110G can also be selected on the basis of a variety of factors including the number of delay elements and the accuracy to be achieved by the data alignment circuit 100. The delay provided by the elements 110A–110G need not all be equal. Typically, the delay elements 110A–110G will all exhibit equal delay with the total delay through the circuit 102 being slightly longer than the period of one bit of the Data signal.

The sampling circuit 103 is formed by flip-flops 116A–116H in the embodiment shown in FIG. 2. The data ("D") input terminal of the flip-flops 116A–116H are connected to receive the original and delayed Data signals present at the nodes 111A–111H, respectively. The clock input terminals of the flip-flops 116A–116H are all connected to simultaneously receive the Clock signal. This circuit configuration causes the output terminals 118A–118H of the flip-flops 116A–116H to provide bit sample signals representative of the logic state of the original and delayed Data signals present at the respective data input terminals. In effect, the bit sample signals at the output terminals 118A–118H are N time-slice samples over a sampling region (i.e., a predetermined length) of the Data signal.

Figure 3:
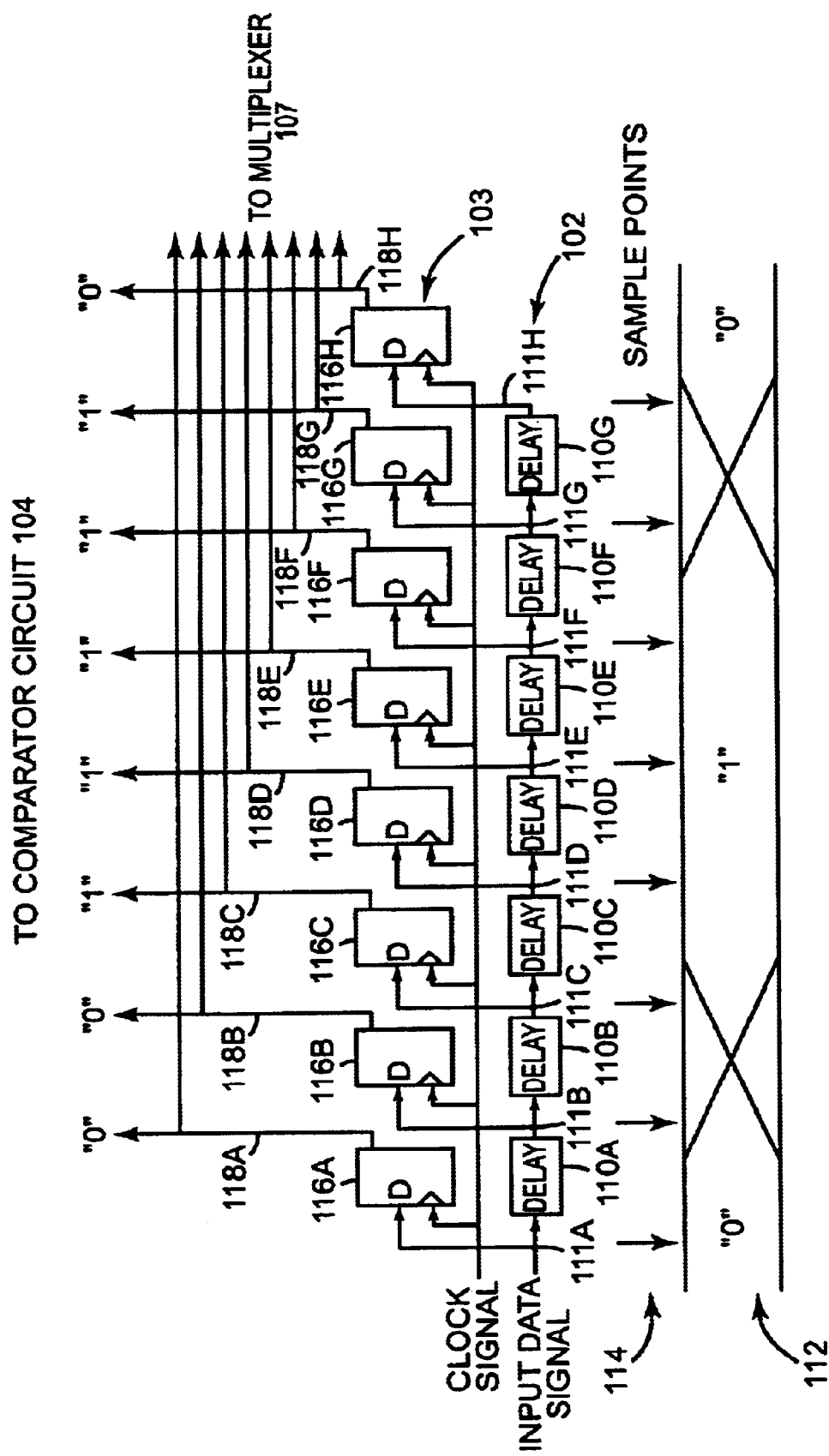
FIG. 3 is a schematic diagram of an exemplary embodiment of the Data signal delay and sampling circuits shown in FIG. 2.

For purposes of illustration, an example of a Data signal eye diagram 112 and Clock signal transitions 114 which are graphically "scaled" to the delay elements 110A–110G is shown in FIG. 3. In this example all the elements 110A–110G provide the same amount of delay, and the sampling region is slightly (i.e., between one and two Clock signal periods) greater than the period of the Data signal bits. Eight time-slice bit samples are therefore provided for each sequential and adjacent sampling region of the Data signal, with each bit of the Data signal being sampled about six or seven times.

Figure 4:
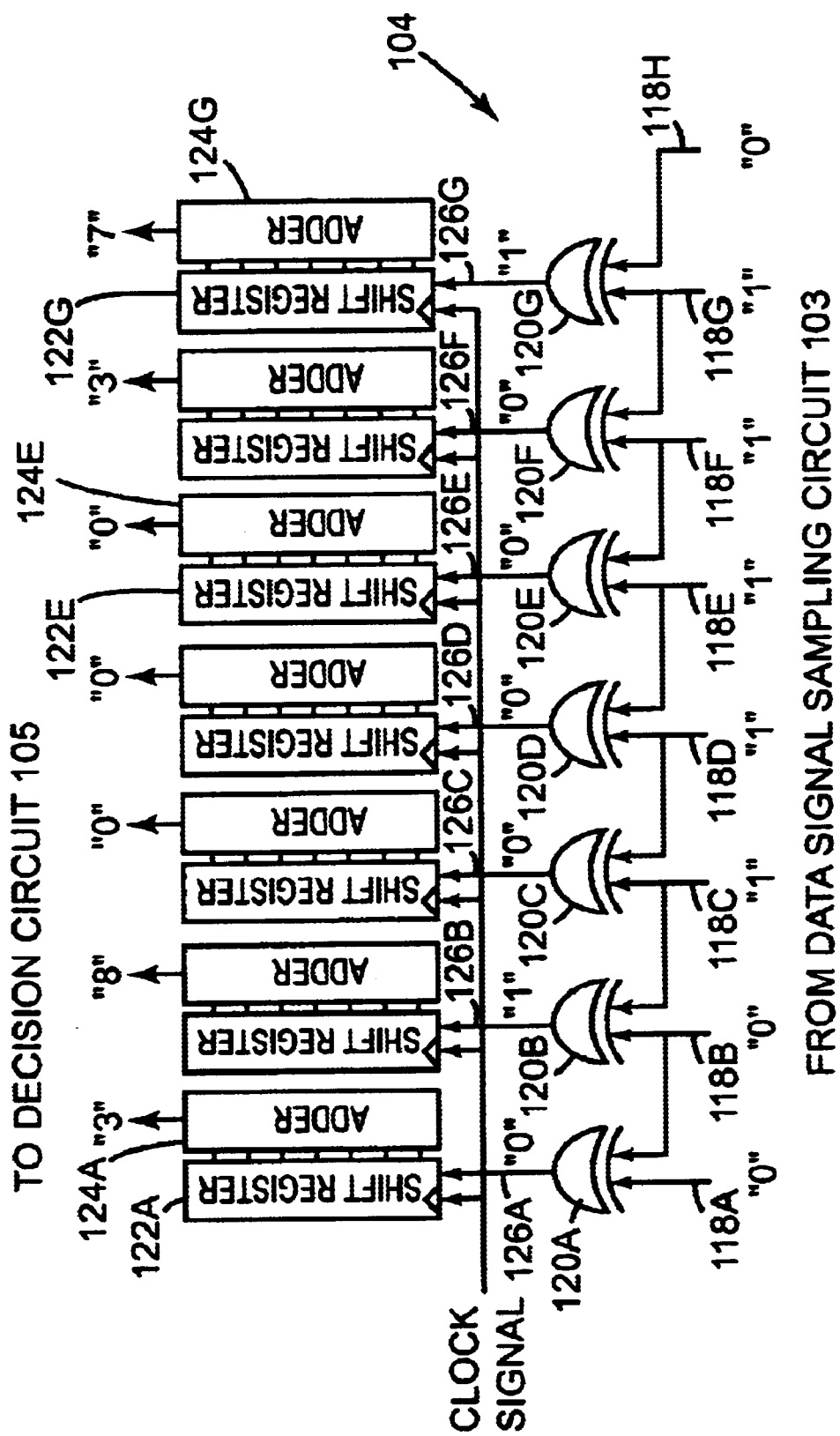
FIG. 4 is a schematic diagram of an exemplary embodiment of the sample comparator circuit shown in FIG. 2.

The operation of the sample comparator circuit 104 can be described in greater detail with reference to FIG. 4. In the embodiment shown, the comparator circuit 104 includes Exclusive Or logic gates 120A–120G, shift registers 122A–122G and adders 124A–124G. Each logic gate 120A–120G is connected to two adjacent flip-flop output terminals 118A–118H to receive as input signals the associated two adjacent time-slice bit samples. Gate 120A, for example, is connected to terminals 118A and 118B, and gate 120B is connected to terminals 118B and 118C. The output terminals 126A–126G of the gates 120A–120G are connected to the inputs of the shift registers 122A–122G, respectively. The clock input terminals of the shift registers 122A–122G are all connected to simultaneously receive the Clock signal. Adders 124A–124G are connected to the respective shift registers 122A–122G.

Figure 1:
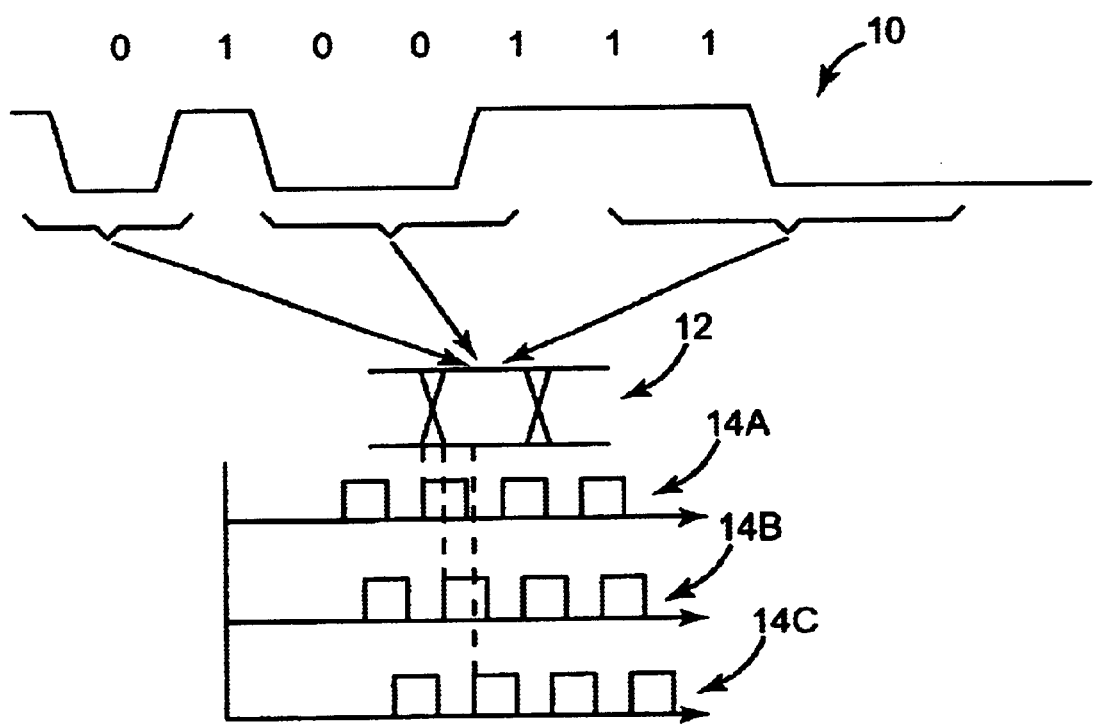
FIG. 1 is an illustration of an exemplary digital Data signal and associated eye diagram, and several Clock signals at different phase relationships to the eye diagram.

Comparator circuit 104 compares the adjacent bit samples on terminals 118A–118H and maintains a running summary of the comparisons. The comparisons are made by the logic gates 120A–120G, which provide comparison data signals representative of whether the adjacent time-slice bit samples have the same or different logic states. If the adjacent bit samples are the same, they were sampled at time slices during which the logic state of the Data signal remained constant, and indicate that the clock pulses are generally synchronized with the stable region of the Data signal eye diagram 12 (FIG. 1). If on the other hand the adjacent time-slice bit samples are different, they were sampled at time slices during which the logic state of the Data signal changed, and indicate that the clock pulses are generally aligned with the transition region of the Data signal eye diagram 12. In the particular circuit embodiment shown, a logic "0" will be present at the output of the logic gates 120A–120G which compared adjacent time-slice bit samples which are the same, and a logic "1" will be present at the output of the logic gates which compared adjacent bit samples which are different.

The comparison data on each terminal 126A–126G is sequentially shifted through the associated shift register 122A–122G with each Clock signal pulses applied to the shift registers. The shift registers 122A–122G, which can be any desired number M bits long, thereby maintains a running record of the comparison data of each time-slice for the preceding or last M samples. Adders 124A–124G add the M comparison data in the associated shift registers 122A–122G to provide comparison data sums. The comparison data sums are in effect equal to the number of logic "1s" present in the associated shift registers 122A–122G. When the Data signal has relatively good signal integrity (and therefore a clean eye diagram), the comparison data sums generated by comparator circuit 104 can be used to accurately identify the time slices within the Data signal bit period at which the signal is in the stable region. In the example shown in FIG. 4, adders 124A, 124B, 124F and 124G all have comparison data sums between three and eight, indicating that the time slices of the Data signal sampled at nodes 111B, 111C, 111G and 111H, respectively, occur during the transition region. Adders 124C–124E, on the other hand, all have comparison data sums equal to zero, indicating that the time slices of the Data signal sampled at nodes 111D–111F, respectively, occur during the stable region. By maintaining a record of the last M comparison data for each time slice, the comparator circuit 104 is able to effectively average out the effects of M bits of the Data signal. Furthermore, by maintaining the record as a running total, the circuit 104 is able to track and appropriately adjust to relative Clock-signal—Data signal phase shifts over time.

The function of the decision circuit 105 is to process the comparison data sums generated by the comparator circuit 104 for the purpose of determining which of the flip-flop output terminals 118A–118H is providing the most stable time-slice bit samples. In particular, the comparison data sums are examined on the basis of a predetermined decision logic algorithm to determine the most stable time-splice bit samples. After the most stable bit sample is identified, the decision circuit 105 generates a sample select signal representative of the selected time-slice bit sample. The sample select signal is transmitted to and used by the multiplexer 107 to select the flip-flop output terminal 118A–118H associated with the optimum time-slice bit sample signal which is to be outputted as the synchronized Data signal.

By way of example, in one embodiment of the invention the decision circuit 105 implements a decision algorithm which selects as the most stable time-slice bit sample the sample at which: 1) the adjacent previous, selected, and adjacent next time-slice bit samples all have comparison data sums equal to zero (i.e., the selected time-slice location has been in the stable region during the previous M clock pulse cycles and must be between locations which have been in the stable region during the previous M clock pulse cycles), 2) any of the adjacent previous, selected, and adjacent next time-slice bit samples was the selected time-slice bit sample during the immediately previous Clock signal period (i.e., the selected location cannot move more than one delay period during a clock pulse period), and 3) the comparison data sum in the time-slice bit sample location two sample locations later in time (i.e., two delay periods) is a non-zero value.

Figure 5:
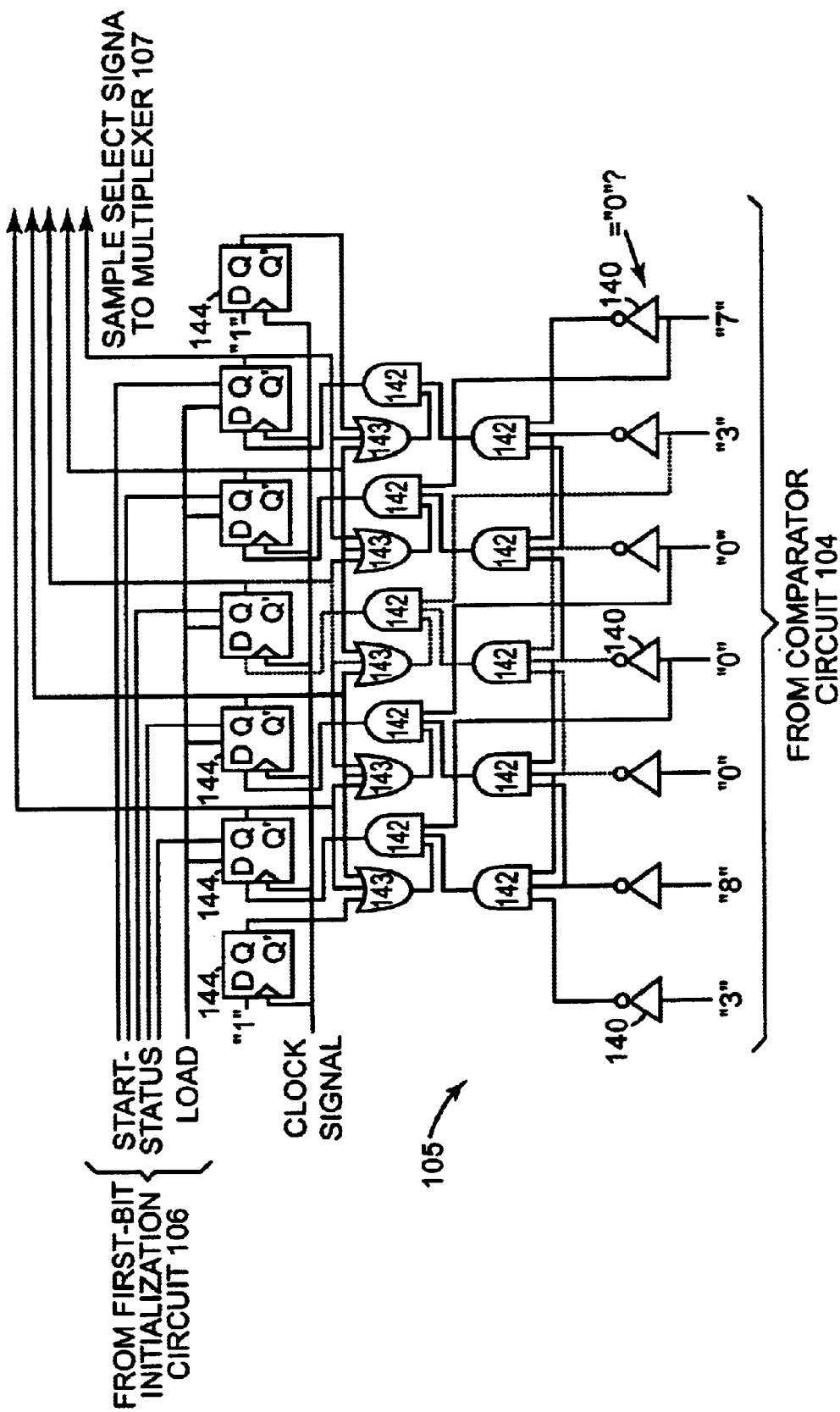
FIG. 5 is a schematic diagram of an exemplary embodiment of the decision circuit shown in FIG. 2.

FIG. 5 is a simplified schematic diagram of a decision circuit 105 which implements the decision algorithm described immediately above. The illustrated embodiment of circuit 105 is formed by inverters 140, logic And gates 142, logic Or gates 143, and D-type flip-flops 144. As described in greater detail below, the decision circuit 105 shown in FIG. 5 is also capable of being interfaced to the first-bit initialization circuit 106. The dashed signal lines in FIG. 5 illustrate the "true" logic path that will cause the flip-flop output terminal 118D to be selected by the multiplexer 107 on the basis of the example bit samples and comparison sums shown in FIGS. 3–5. It is to be understood, however, that the decision algorithm and associated circuit described above are provided only for purposes of example. The function of the decision circuit 105 can be implemented by other decision algorithms to meet the particular requirements, environment or other factors associated with the particular system in which the circuit 100 is to be implemented. Also, the desired decision algorithm can be implemented by other circuit configurations.

The components of the data alignment circuit 100 described above cause each and every bit of the Data signal bit stream to be sampled at several time slice locations, the adjacent time-slice samples to be compared and the optimum clock phase synchronized time-slice bit location to be selected by the multiplexer 107 and used as the Data signal. The selected sampling location will generally be located prior to the start of the signal transition region. As the Data signal and Clock signal phases drift with respect to one another due to temperature variations or other factors, the circuit 100 will continue to track the data stream and adjust accordingly.

The invention also offers the capability of having the circuit 100 align the first bit as well as subsequent bits of a Data signal with the Clock signal. This function is enabled in the illustrated embodiment of circuit 100 by the use of the Data Ready signal which is provided to the circuit in addition to the Data signal. The Data Ready signal is a signal which switches logic states at the time corresponding to the start of the incoming Data signal bit stream.

Figure 6:
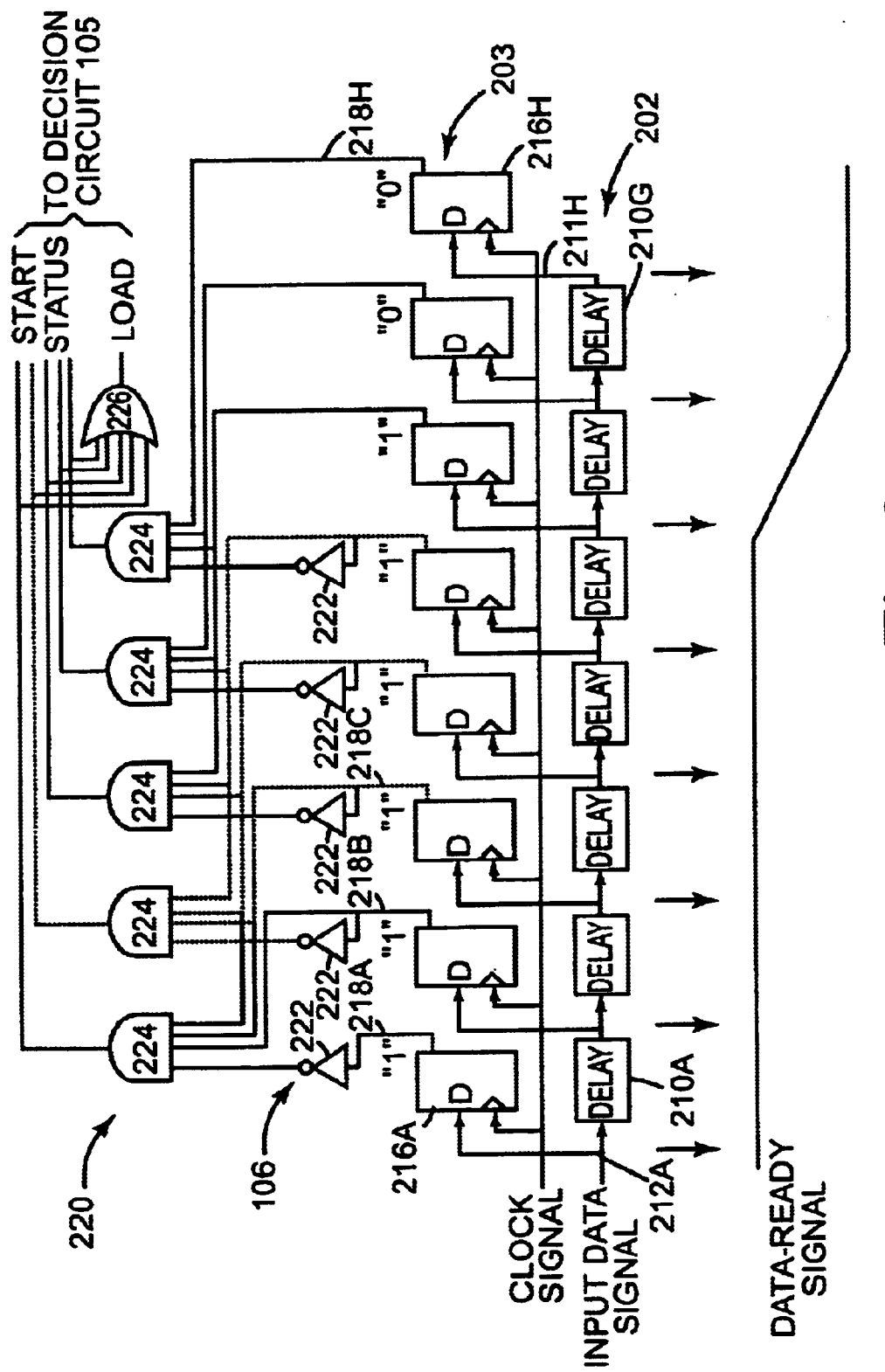
FIG. 6 is a schematic diagram of an exemplary embodiment of the first-bit initialization circuit shown in FIG. 2

FIG. 6 is a schematic illustration of a first-bit initialization circuit 106 which is configured to operate with a Data Ready signal of the type described above. The Data Ready signal is also shown in FIG. 6 in a form graphically "scaled" to the circuit 106. In the illustrated embodiment the Data Ready signal switches from a logic "0" state to a logic "1" state with its rising edge identifying the start of the incoming data stream. The alignment circuit 100 accepts the Data signal and phase synchronizes the Data signal to the Clock signal as long as the Data Ready signal is at the logic "1" state. When the Data Ready signal is at the logic "0" state (i.e., when no valid data is being transmitted), the data bit alignment circuit 100 ignores the Data signal.

The first-bit initialization circuit 106 shown in FIG. 6 includes a data ready signal delay circuit 202 and data ready signal sampling circuit 203. Delay circuit 202 and sampling circuit 203 are substantially similar to the data signal delay circuit 102 and data signal sampling circuit 102 described above and have components identified by corresponding reference numbers. Delay circuit 202 and sampling circuit 203 process the Data Ready signal in a manner similar to that by which the circuits 102 and 103, respectively, process the Data signal, and thereby produce Data Ready signal time-slice samples at the output terminals 218A–218H of the flip-flops 216A–216H, respectively.

The data ready time-slice samples on terminals 218A–218H are processed by an edge transition identification circuit 220. In particular, the transition identification circuit 220 processes the data ready time slice samples on the basis of a predetermined algorithm to identify the flip-flop output terminal 218A–218H on which the Data Ready signal edge transition occurs. The illustrated embodiment of edge transition identification circuit 220 produces a Start Status signal representative of the flip-flop output terminal 218A–218H on which the Data Ready signal edge transition was identified, and a Load signal indicating that the signal edge was identified. In the embodiment shown, the edge transition identification circuit is formed by inverters 222, logic And gates 224 and logic Or gate 226 to implement a decision algorithm which effectively identifies the rising edge as the last time-slice sample having a logic "0" state before three adjacent time-slice sample locations having a logic "1" state. It is to be understood, however, that the transition identification decision algorithm and associated circuit described above are provided only for purposes of example. The function of the transition identification circuit 220 can be implemented by other decision algorithms to meet the particular requirements, environment or other factors associated with the particular system in which the circuit 100 is to be implemented. Also, the desired decision algorithm can be implemented by other circuit configurations. For example, the component count of the circuit 106 can be generally reduced through the use of a toggling Data Ready signal which remains at a continuous logic "0" state during periods of time that the Data signal is not being transmitted, but toggles between a logic "1" and logic "0" state during every bit of the Data signal. Using a Data Ready signal of this type would facilitate the removal of the comparator circuit 104, with the first-bit alignment circuit 106 used to track the phase alignment of the Data and Clock signals with every transition of the Data Ready signal.

When the transition of a Data Ready signal is identified, first-bit initialization circuit 106 causes the corresponding time-slice sample location to be loaded into the multiplexer 107 (FIG. 2) through the decision circuit 105 (FIG. 5). In particular, the Start Status signal and Load signal from the transition identification circuit 220 are coupled to the flip-flops 144 of the decision circuit 105. On the next pulse of the Clock signal the flip-flops 144 cause the identified edge transition time-slice sample location to be applied to the multiplexer 107 as a first-bit select signal. The flip-flop output terminal 1118A–118H associated with the time-slice location selected by the first-bit initialization circuit 106 and decision circuit 105 in the manner described above will be used by the data bit alignment circuit 100 until the time-slice sample selection function is provided by circuits 102, 103, 104 and 105 in the manner described above.

The accuracy of the first-bit initialization function provided by the circuit 106 described above is dependent upon the degree to which the transition of the Data Ready signal is phase aligned with the first data bit of the Data signal. Unlike the Clock signal which is typically distributed from a common source to several subsystems over separate paths, the Data Ready signal can be produced by the same subsystem which produced the Data signal and transmitted to the same subsystem as the Data signal over paths having characteristics similar to those over which the Data signal was transmitted. A relatively high degree of phase alignment between the Data Ready and Data signals, and therefore accuracy of the first-bit alignment function, can thereby be achieved by the present invention. Furthermore, although described in connection with a Data Ready signal, it is also possible to implement the first-bit alignment function using delay and logic circuits that process only the Data signal (e.g., do not make use of the Data Ready signal).

Figure 7:
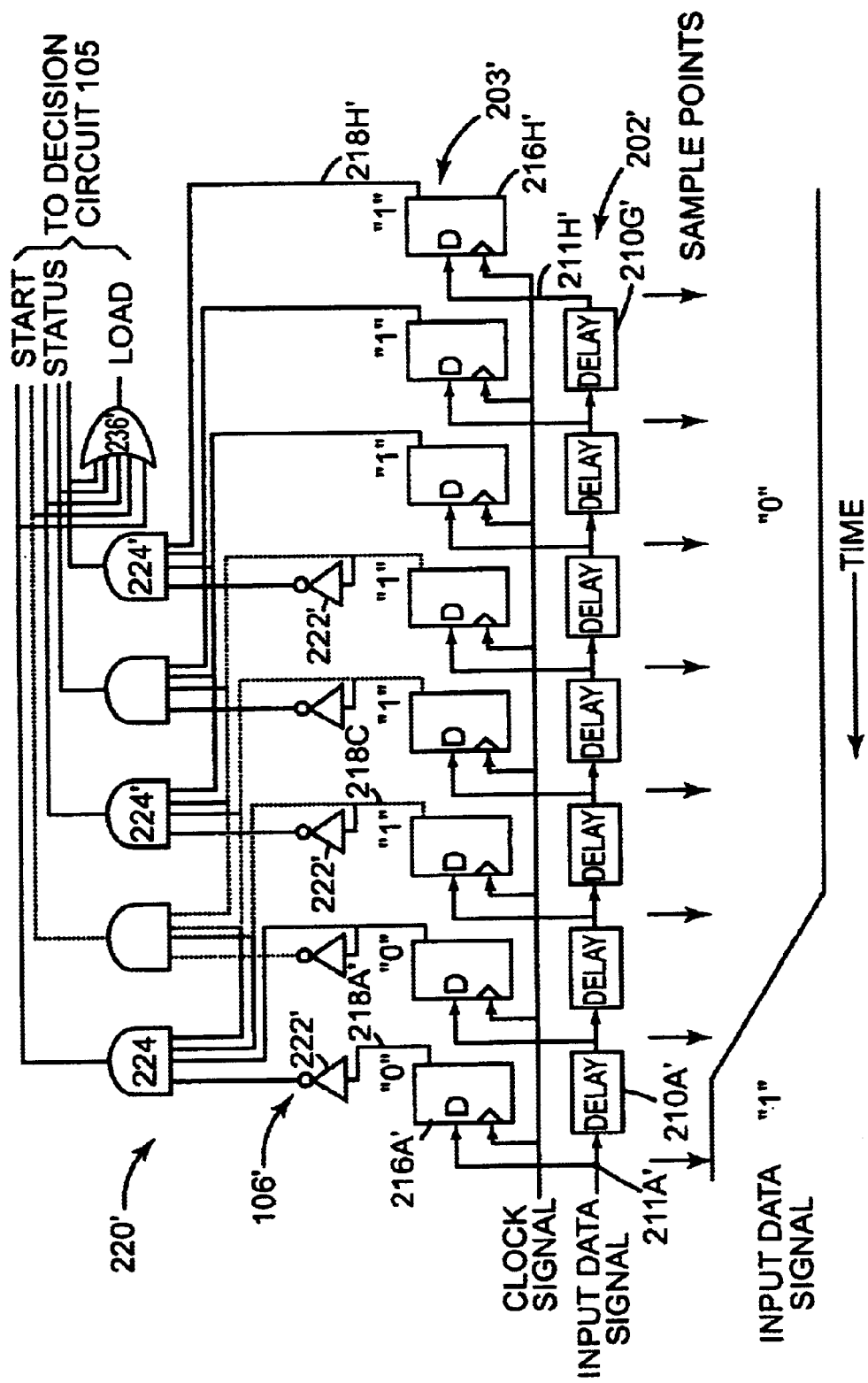
FIG. 7 is a schematic diagram of an alternative embodiment of the first-bit initialization circuit shown in FIG. 2.

FIG. 7 is a schematic illustration of a first-bit initialization circuit 106' which is configured to operate without a Data Ready signal of the type described above. Circuit 106' is similar to circuit 106 described above, and similar features are illustrated with similar reference numbers. The first-bit initialization circuit 106' shown in FIG. 7, however, uses a logic state transition (e.g., logic "0" to logic "1" in the illustrated embodiment) in the Data signal for purposes of causing the circuit 100 to align the first as well as subsequent bits of a Data signal with the Clock signal. The Data signal is therefore effectively used to provide the initial bit initialization control function in this embodiment. Accordingly, the Data signal is applied to the delay circuit 202' (rather than the Data Ready signal applied to circuit 202 in FIG. 6). One benefit of initialization circuit 106' is that it does not require the use of a separate Data Ready signal. However, for optimum performance of circuit 106', the Data signal should be held at the first or logic "0" state during periods that no valid data is being transmitted, and to transition to a second or logic "1" state at the first bit.

Although described above in connection with a single serial Data signal bit stream with a time-aligned Data Ready signal and asynchronous Clock signal, those skilled in the art will recognize that the invention can be readily adapted for use in parallel Data signal applications, and at a reduced component count per bit. For example, in a parallel Data signal application a delay circuit such as 102, sampling circuit such as 103 and multiplexer such as 107 can be incorporated into every bit path of the signal (word). However, only one comparator circuit such as 104, decision circuit such as 105 and initialization circuit such as 106 need be incorporated into the alignment circuit for each parallel Data signal. An embodiment of this type operates on the basis that the phase skew between the Clock signal and all the bits of the parallel Data signal are substantially similar (for reasons similar to those described above with respect to the Data Ready and Data signals). The time-slice sample location selected by the circuits 104, 105 and 106 can therefore be used to control the selection of the sample location for the remaining bits of the parallel Data signal, while maintaining a high degree of phase alignment accuracy for these remaining bits.

Data bit alignment circuit 100 offers considerable advantages. It can be applied in a variety of digital communication and other systems in which it is important to sample the incoming Data signal bit stream at an optimal point in time. It can be substituted into applications in which the clock signal would otherwise have been extracted from the Data signal bit stream with a clock recovery circuit that does not necessarily optimally phase align the Clock and Data signals. Errors that might otherwise be present because of phase misalignments can thereby be reduced. Furthermore, with ever increasing data rates and complexity of high performance computer systems, the data bit alignment circuit can be used to substantially reduce the clock alignment requirements and to improve the performance (i.e. to reduce the bit error rate) of the system. By incorporating the alignment circuit into the input buses of each subsystem, the need to align each clock signal to each component throughout the subsystem is reduced or even eliminated. In short, the invention can dramatically reduce the design difficulties and required technology for digital data processing systems employing high data rates and extend the performance of an isochronous system.

Although the present invention has been described with reference to preferred embodiments, those skilled in the art will recognize that changes can be made in form and detail without departing from the spirit and scope of the invention.

What is claimed is:

1. A circuit for aligning the phase of a data signal to a clock signal, including:

a data signal delay and sampling circuit connected to receive the data signal and the clock signal, for providing a plurality of time-slice bit samples of the data signal;

a comparator and decision circuit coupled to the data signal delay and sampling circuit, for comparing and selecting one of the plurality of time-slice bit samples which is phase aligned with the clock signal;

a multiplexer coupled to the data signal delay and sampling circuit and to the comparator and decision circuit, for outputting the selected time-slice bit sample as the phase-aligned data signal; and an initial-bit intialization circuit connected to receive the clock signal and an initial-bit control signal and coupled to the multiplexer, for causing the time-slice bit sample corresponding in time to the initial bit control signal to be outputted as an initial one or more bits of the phase-aligned data signal before the comparator and decision circuit operates to compare and select one of the plurality of time-slice bit samples.

2. The circuit of claim 1 wherein the initial-bit initialization circuit causes the time-slice bit sample corresponding in time to the initial bit control signal to be outputted as the first one or more bits of the phase-aligned data signal.

3. The circuit of claim 2 wherein:

the initial-bit initialization circuit provides an initial-bit select signal representative of the selected time-slice bit sample corresponding to the initial bit control signal; and the comparator and decision circuit includes registers for providing a sample select signal representative of the selected time-slice bit sample to the multiplexer, and wherein the registers are loaded with the initial-bit select signal to select the time-slice bit sample corresponding to the initial bit control signal as the first one or more bits of the phase-aligned data signal.

4. The circuit of claim 3 wherein:

the initial-bit initialization circuit also provides an initial-bit load signal indicating the availability of the initial-bit select signal; and the comparator and decision circuit causes the registers to be loaded with the initial-bit select signal in response to the initial-bit load signal.

5. The circuit of claim 4 wherein:

the initial bit control signal includes a data ready signal having a logic state transition which is aligned with a first bit of the data signal; and the initial-bit initialization circuit includes an edge transition identification circuit for detecting the logic state transition in the data ready signal, and causes the time-slice bit sample corresponding in time to the detected logic state transition in the data ready signal to be outputted as an initial one or more bits of the phase-aligned data signal.

6. The circuit of claim 5 wherein:

the initial-bit initialization circuit further includes a data ready signal delay and sampling circuit connected to receive the data ready signal and the clock signal, for providing a plurality of time-slice samples of the data signal; and the edge transition identification circuit is coupled to the data ready signal delay and sampling circuit and compares the time-slice samples of the data ready signal to detect the logic state transition.

7. The circuit of claim 1 wherein:

the initial-bit initialization circuit is coupled to the multiplexer through the comparator and decision circuit and provides an initial-bit select signal representative of the selected time-slice bit sample corresponding to the initial bit control signal and an initial-bit load signal indicating the availability of the initial-bit select signal; and the comparator and decision circuit includes registers for providing a sample select signal representative of the selected time-slice bit sample to the multiplexer, and wherein the registers are loaded with the initial-bit select signal in response to the initial bit load signal.

8. The circuit of claim 1 wherein the initial bit control signal includes the data signal.

9. The circuit of claim 1 wherein the initial-bit initialization circuit causes the time-slice bit sample corresponding in time to an initial logic state transition of the data signal to be outputted as an initial one or more bits of the phase-aligned data signal.

10. A circuit for aligning the phase of a parallel data signal to a clock signal, including:

a parallel data terminal for receiving a parallel data signal formed by multiple word bits;

a clock terminal for receiving a clock signal;

a data ready terminal for receiving an initial bit control signal which has a logic state transition aligned with a first information bit of the parallel data signal;

a plurality of data signal delay and sampling circuits connected to the clock terminal and the parallel data terminal, for providing time-slice bit samples of each information bit of the parallel data signal;

a comparator and decision circuit coupled to the clock terminal and at least one of the data signal delay and sampling circuits, for comparing and selecting one of the plurality of time-slice bit samples which is phase aligned with the clock signal;

a multiplexer circuit coupled to each data signal delay and sampling circuit and to the comparator and decision circuit, for outputting the selected time-slice bit sample of each word bit of the parallel data signal as the phase-aligned parallel data signal; and a first-bit intialization circuit connected to the clock terminal and the data ready terminal and coupled to the multiplexer, for causing the time-slice bit samples corresponding in time to the logic state transition of the initial bit control signal to be outputted as a first one or more information bits of the phase-aligned data signal before the comparator and decision circuit operates to compare and select one of the plurality of time-slice bit samples.

11. The circuit of claim 10 wherein the initial-bit initialization circuit is coupled to the multiplexer through the comparator and decision circuit and causes the comparator and decision circuit to select the time-slice bit sample corresponding to the logic state transition of the initial bit control signal as the first one or more bits of the phase-aligned parallel data signal.

12. The circuit of claim 11 wherein:

the first-bit initialization circuit provides a first-bit select signal representative of the selected time-slice bit sample corresponding to the initial bit control signal; and the comparator and decision circuit includes registers for providing the sample select signal representative of the selected time-slice bit sample to the multiplexer, and wherein the registers are loaded with the first-bit select signal to select the time-slice bit sample corresponding to the logic state transition of the initial bit control signal.

13. The circuit of claim 12 wherein:

the first-bit initialization circuit also provides a first-bit load signal indicating the availability of the first-bit select signal; and the comparator and decision circuit causes the registers to be loaded with the first-bit select signal in response to the first-bit load signal.

14. The circuit of claim 13 wherein the first-bit initialization circuit further includes:

a initial bit control signal delay and sampling circuit connected to receive the initial bit control signal and the clock signal, for providing a plurality of time-slice samples of the initial bit control signal; and an edge transition identification circuit coupled to the initial bit control signal delay and sampling circuit, for comparing the time-slice samples of the initial bit control signal to detect the logic state transition.

15. The circuit of claim 10 wherein the initial bit control includes the data signal.

16. The circuit of claim 15 wherein the first bit initialization circuit causes the time-slice bit sample corresponding in time to an initial logic state transition of the data signal to be outputted as an initial one or more bits of the phase-aligned data signal.

17. The circuit of claim 10 wherein the initial bit control signal is a data ready signal.

* * * * *

UNITED STATES PATENT AND TRADEMARK OFFICE
CERTIFICATE OF CORRECTION

PATENT NO. : 6,704,882 B2  
DATED : March 9, 2004  
INVENTOR(S) : Patrick Joseph Zabinski et al.

It is certified that error appears in the above-identified patent and that said Letters Patent is hereby corrected as shown below:

<u>Column 9,</u>  
Line 43, delete "intialization" and replace it with -- initialization --

Signed and Sealed this

Twenty-ninth Day of June, 2004

JON W. DUDAS  
*Acting Director of the United States Patent and Trademark Office*